United States Patent [19]

Bräuninger et al.

[11] Patent Number: 5,313,855
[45] Date of Patent: May 24, 1994

[54] SYSTEM FOR THE OPEN-LOOP CONTROL OF A MOTOR VEHICLE

[75] Inventors: Jürgen Bräuninger, Stuttgart; Herbert Schramm, Leonberg-Höfingen; Volker Kadelbach, Freiberg; Josef Wirz, Erdmannhausen; Thomas Küttner, Stuttgart; Dieter Seher, Ilsfeld; Wolfgang Flögel, deceased, late of Esslingen, all of Fed. Rep. of Germany, b Roland Flögel, Katharina Flögel, heirs

[73] Assignee: Robert Bosch GmbH, Stuttgart, Fed. Rep. of Germany

[21] Appl. No.: 757,683

[22] Filed: Sep. 11, 1991

[30] Foreign Application Priority Data

Sep. 11, 1990 [DE] Fed. Rep. of Germany ....... 4028809

[51] Int. Cl.⁵ .............................................. F16H 59/74
[52] U.S. Cl. .................................... 477/111; 180/197; 477/107
[58] Field of Search ................. 74/857, 858, 859, 860; 180/197

[56] References Cited

U.S. PATENT DOCUMENTS

| 5,083,479 | 1/1992 | Ito et al. ................. 74/860 |
| 5,101,786 | 4/1992 | Kamio et al. ............ 74/860 X |
| 5,159,990 | 11/1992 | Abe et al. ................ 180/197 |
| 5,163,530 | 11/1992 | Nakamura et al. ....... 180/197 |
| 5,168,950 | 12/1992 | Krusche .................. 180/197 |
| 5,183,128 | 2/1993 | Ito et al. ................. 180/197 |

Primary Examiner—Dirk Wright
Attorney, Agent, or Firm—Kenyon & Kenyon

[57] ABSTRACT

A system for controlling a positioning unit in a motor vehicle includes various control units that influence the positioning unit coupled thereto. A drive slip control and an automatic transmission control both supply a control signal. Yet another control signal is dependent upon a driver request signal. For a period of time, the control signal from the automatic transmission control takes precedence over the other control signals.

17 Claims, 5 Drawing Sheets

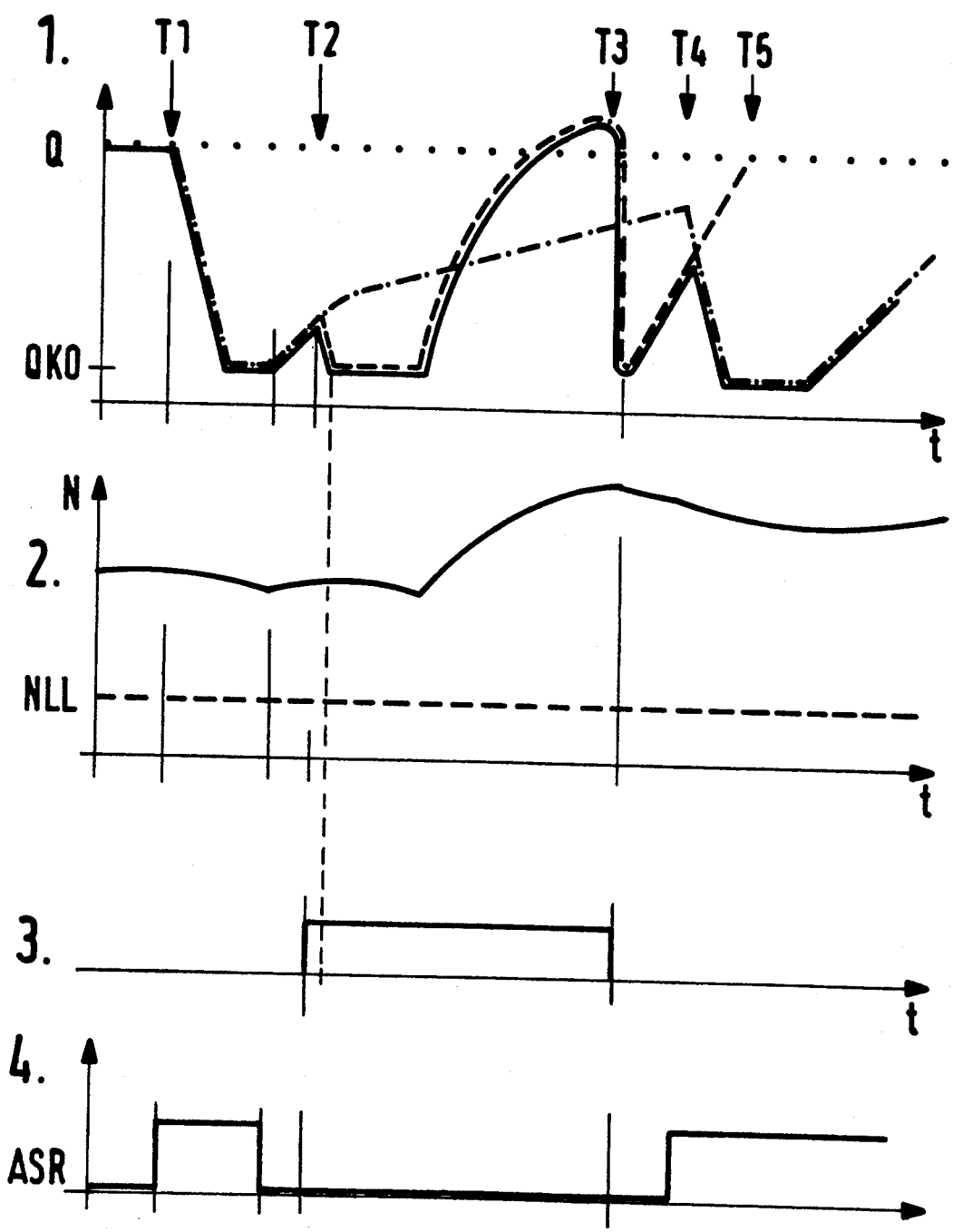

SYSTEM FOR THE OPEN-LOOP CONTROL OF A MOTOR VEHICLE

FIELD OF THE INVENTION

The present invention relates to a system for the open-loop control of a positioning unit in a motor vehicle.

BACKGROUND OF THE INVENTION

VDI Reports 612, *Electronics in Automotive Construction* describes a so-called CAN system. This system introduces the use of networked subsystems instead of the use of single, separate control units. The CAN system has separate control units that assume various functions, such as controlling the fuel injection process, automatic transmission control, as well as other tasks. In this type of system, all of the control units are connected to each other, as well as to all of the sensors and actuators. Difficulties arise in such a system when the various control units send conflicting control signals to the performance-regulating servo unit. Thus, one control unit may call for a decrease in the power output, while another control unit for an increase in the power output.

German Published Patent Application 33 31 297 (U.S. Pat. No. 4,583,611) describes a device for preventing the drive wheels of a motor vehicle from rotating by setting a power-regulating positioning unit in a direction of lesser power output. Such a device is commonly referred to as a drive slip control (ASR). Typically in such systems, however, the brakes are also controlled.

German Published Patent Application 28 48 624 (U.S. Pat. No. 4,266,447) describes a method for controlling automatic transmissions. According to this method, when the gear unit is actuated, a power-regulating positioning unit is controlled in a particular manner.

In systems which employ an automatic transmission control in addition to a drive slip control, it is possible for the drive slip control and the automatic transmission control to influence the quantity of fuel to be injected at the same time or at overlapping times. Any interventions, i.e., adjustments, in the fuel quantity by the automatic transmission control must not be hindered by the interventions of another control unit, otherwise, the gear of the transmission will not be able to be engaged. Similarly, intervention by the drive slip control must not be hindered by other power-regulating interventions.

One of the objects of the present invention is to provide a system to determine which of a plurality of control units acting simultaneously on a power-regulating positioning unit will actually control the positioning unit.

SUMMARY OF THE INVENTION

The present invention provides a system for the open-loop control of a positioning unit in a motor vehicle. The system according to the present invention determines clearly which control unit affects the position of a power-regulating positioning unit when several control units intervene. Moreover, in the case of an intervention, an automatic transmission control can not only decrease power output, but also increase it. Thus, an intervention increasing the power output is possible during an intervention by a drive slip control.

BRIEF DESCRIPTION OF THE DRAWINGS

FIGS. 4a, 4b and 4c show various signals plotted as a function of time.

DETAILED DESCRIPTION OF THE INVENTION

The system according to the present invention is described in association with a self-ignitable internal-combustion engine. In such an engine, the quantity of fuel that is supplied to the engine determines the power. In the case of self-ignitable internal-combustion engines, instead of a control signal, a signal relative to the throttle-valve position, or another signal which defines the power output of the internal-combustion engine, is selected. For example, such a signal can be a suitable firing signal. The system according to the present invention can also be advantageously applied to other types of internal-combustion engines.

Figure 1:
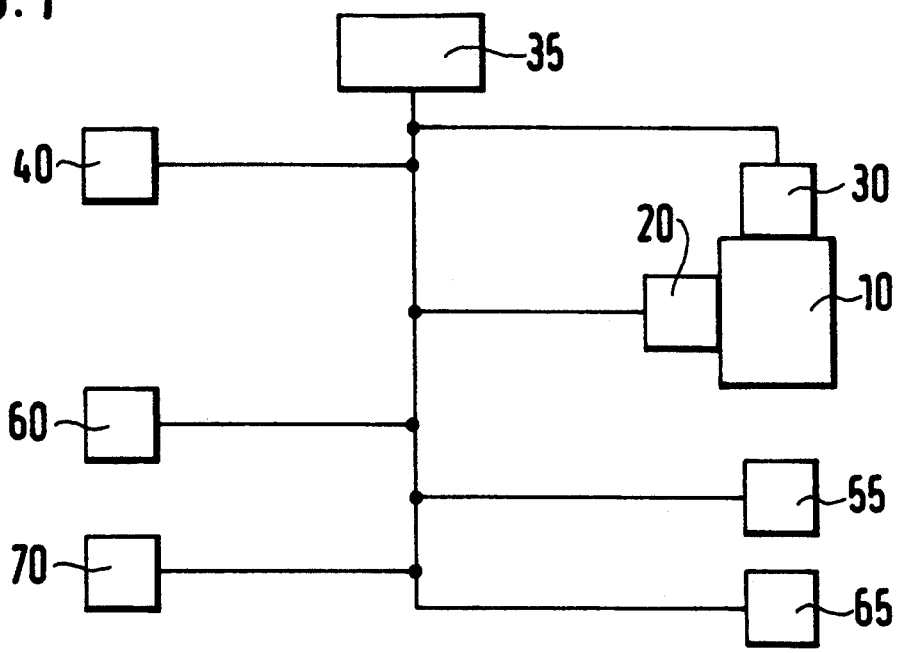
FIG. 1 is a block diagram of the system according to the present invention.

FIG. 1 is a block diagram of the system according to the present invention. An internal-combustion engine 10 is coupled to a positioning unit 20. A first set of sensors 30 measures operating parameters in the internal-combustion engine 10. A second set of sensors 35 detects environmental conditions, such as air pressure and air temperature.

A first control unit (EDC) 40 delivers a control signal QK to the positioning unit 20. A second control unit, in particular an automatic transmission control (GS) 60, delivers a control signal QKG to the first control unit 40, as well as to a gear unit 55. A third control unit, in particular a drive slip control (ASR) 70, also delivers a control signal QKA to the first control unit 40, as well as to a brake 65. In other words, all of the control signals are fed to the first control unit 40, which determines which of the control signals actually controls the position of the positioning unit 20. The control units 40, 60, and 70, the sensors 30 and 35, the positioning unit 20, the gear unit 55 and the brake 65 are intercoupled via a common line. This line is used for signal transfer.

If one of the sensors 30 or 35 receives a signal, the signal is available to all of the control units 40, 60 and 70 via the common line. If one of the control units 40, 60 or 70 emits a signal, that signal is available to the positioning unit 20. The system requires only one line to transmit all of the data. Such systems, in which all of the components are intercoupled, are commonly referred to as CAN systems.

Figure 2:
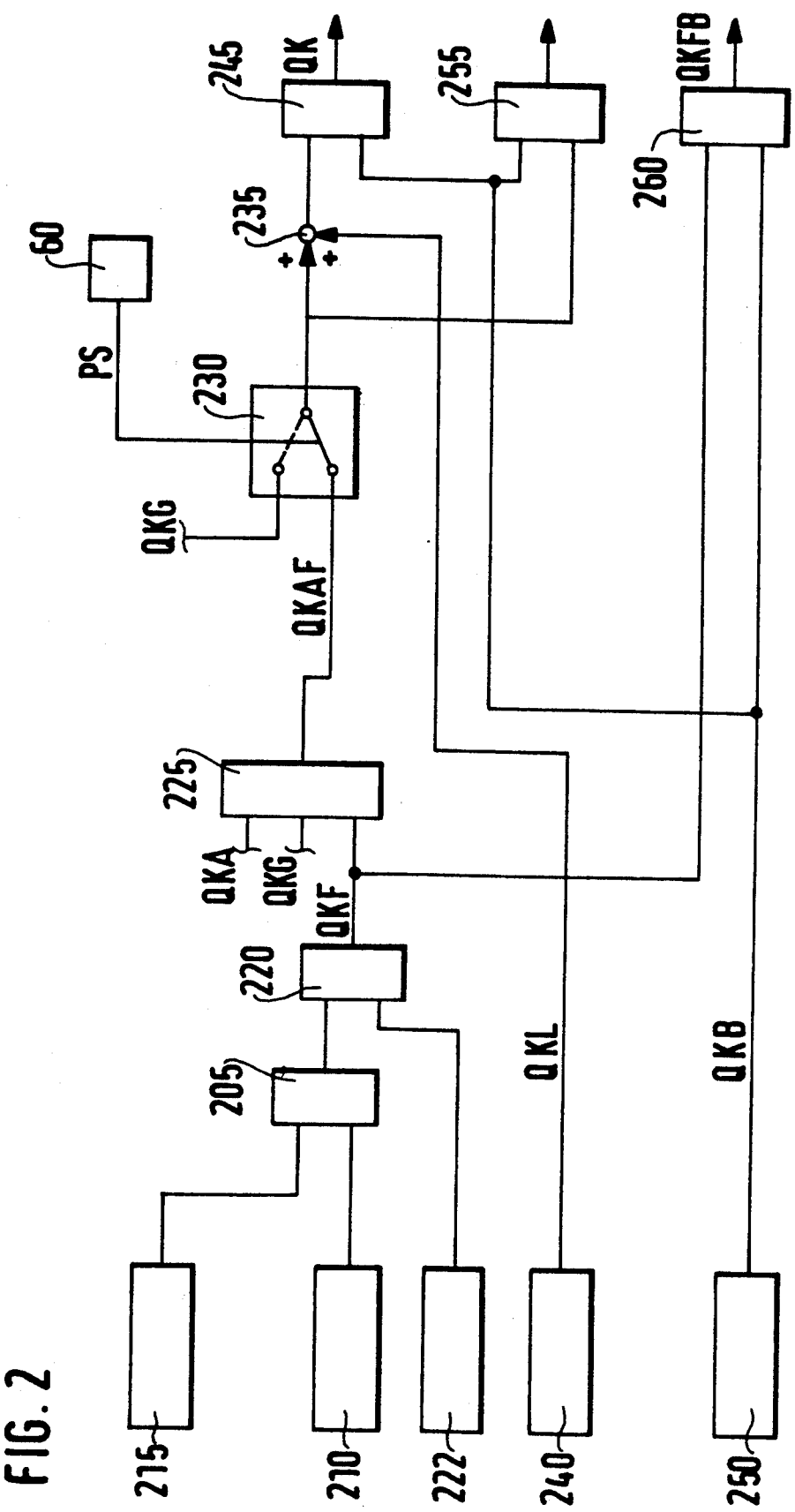
FIG. 2 is a block diagram of a first control unit of the system o FIG. 1, showing the interaction of various control signals.

FIG. 2 is a block diagram of the first control unit 40 which shows the interaction of various control signals. A first maximum selection unit 205 outputs the larger of the output signals from a driving performance unit 215 and an intermediate speed controller 210. A cruise controller can replace the intermediate speed controller 210. The output signal from the first maximum selection unit 205 is received by a first minimum selection unit 220, which outputs the smaller of the output signals from the first maximum selection unit 205 and a speed limitation unit 222. The output signal of the first minimum selection unit 220 is referred to as a driver request signal QKF.

In a second minimum selection unit 225, the driver request signal QKF is compared with the control signal QKA from the drive slip control 70 and to the control signal QKG from the automatic transmission control 60. The smallest of these signals is fed to a switching device 230 via a signal QKAF. If the automatic transmission control 60 emits a priority signal PS, the switching device 230 is positioned as indicated by the dotted line. Depending upon the state of the priority signal PS, the switching device 230 transfers either the signal QKAF or the control signal QKG of the automatic transmission control 60 to a first input of a summing device 235.

The output signal QKL from an idle-speed controller 240 is applied to a second input of the summing device 235. The sum of these two signals is then applied to a third minimum selection unit 245, which compares the sum of output from the summing device 235 with the output signal QKB from a limiting device 250. The smaller of these two signals determines the position of the power-regulating positioning unit 20.

In the case of an internal combustion engine 10, the output signal from selection unit 245 is the current fuel quantity QK. Depending upon this signal QK, a pump unit determines the control variables for the power-regulating positioning unit 20. In the case of a diesel engine, this is a regulating rod position, or a solenoid valve that influences the injection period.

The output signal from the switching device 230, as well as the output signal from the limiting device 250, are received by a fourth minimum selection unit 255, which supplies a control signal to the drive slip control 70. The output signal QKF from the first minimum selection unit 225 and the output signal QKB from the limiting device 250 are received by a fifth minimum selection unit 260, which supplies a limited driver request signal QKFB.

The functioning of the system of the present invention is as follows. If the automatic transmission control 60 emits a priority signal PS, the switching device 230 is positioned as indicated by the dotted line. This means that the driving performance unit 215, the speed limitation unit 222, and the drive slip control 70 no longer have control over the positioning unit 20. Rather, the control signal QKG from the automatic transmission control 60 controls the positioning unit 20. In addition to the fuel quantity required by the automatic transmission control 60, the idling signal QKL is applied to the summing device 235. This ensures that the speed of the internal-combustion engine 10 does not fall below the idling speed. The sum of the control signal QKG from the automatic transmission control 60 and the idling signal QKL is limited by the third minimum selection unit 245 to a value less than or equal to the full-load, or the smoke emission limit.

Figure 3:
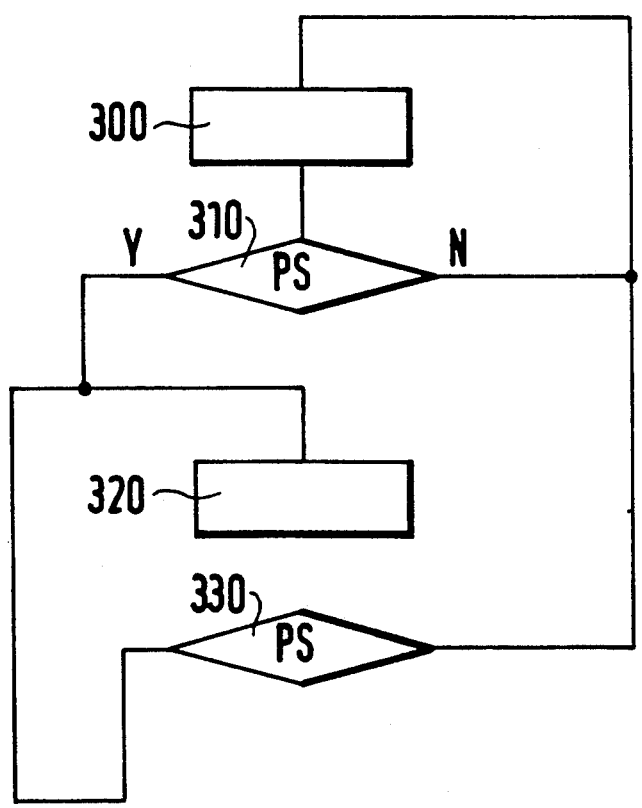
FIG. 3 is a flowchart of the operation of the system according to the present invention.

FIG. 3 is a flowchart of the operation of the system according to the present invention. In step 300, the smaller of the driver request signal QKF, the control signal QKA from the drive slip control 70, and the control signal QKG from the automatic transmission control 60 determines the fuel quantity to be injected.

In step 310, it is determined whether a priority signal PS from the automatic transmission control 60 is present. If no such signal is present, the output signal QKAF from the second minimum selection unit 225 is applied, via the switching device 230 and the summing device 235, to the third minimum selection unit 245. In this case, the smaller of the driver request signal QKF, the control signal QKG from the automatic transmission control 60, the control signal QKA from the drive slip control 70, the output signal QKB from the limiting device 250, and the output signal QKL from the idle-speed controller 240 determines the fuel quantity to be injected. This corresponds to the normal operation of step 300.

On the other hand, if the inquiry unit 310 recognizes the existence of a priority signal PS from the automatic transmission control 60, the switching device 230 is shifted, in step 320, to the position indicated by the dotted line. In this manner, the control signal QKG from the automatic transmission control 60 is applied to the third minimum selection unit 245 via the summing device 235, and, therefore, the quantity of fuel supplied to the internal-combustion engine 10 is determined to a significant extent by the automatic transmission control 60.

For small control signal values QKG of the automatic transmission control 60, the idling signal QKL also has an effect, because it is added to control signal QKG in the summing device 235. For large control signal values QKG, the signal QK is limited in the third minimum selection unit 245 to the output signal QKB from the limiting device 250. This ensures that specified limiting values, for example relative to the full load and/or the smoke emission limit, are not exceeded.

The priority signal PS from the automatic transmission control 60 is released at the beginning of the switching operation. The priority signal PS is canceled when it is determined that a gear has been engaged or that there is a power transmission between the drive train and the wheels.

It is particularly advantageous for the priority signal PS to be released only after the control signal QKG has been decreased to zero. The advantage is that the drive slip control 70 is capable of further decreasing the signal during the time that the signal decreases as a result of the automatic transmission control 60.

If the inquiry unit 330 determines that a priority signal PS is no longer present, step 300 follows. In this case, the up-to-date signal is applied as the starting value for a fuel-quantity intervention. If the inquiry unit 330 determines that a priority signal PS is present, step 320 follows.

During the time that the priority signal PS from the automatic transmission control 60 is present, the drive slip control 70 continues to control. It continues to acquire the input variables and calculate a manipulated variable. However, it does not have any effect on the quantity of fuel to be injected. This means that the drive slip control 70 supplies a control signal QKA that does not have any influence on the quantity of fuel to be injected, as shown in FIG. 2, in that the switch device 230 is positioned as indicated by the dotted line.

Figure 4B:
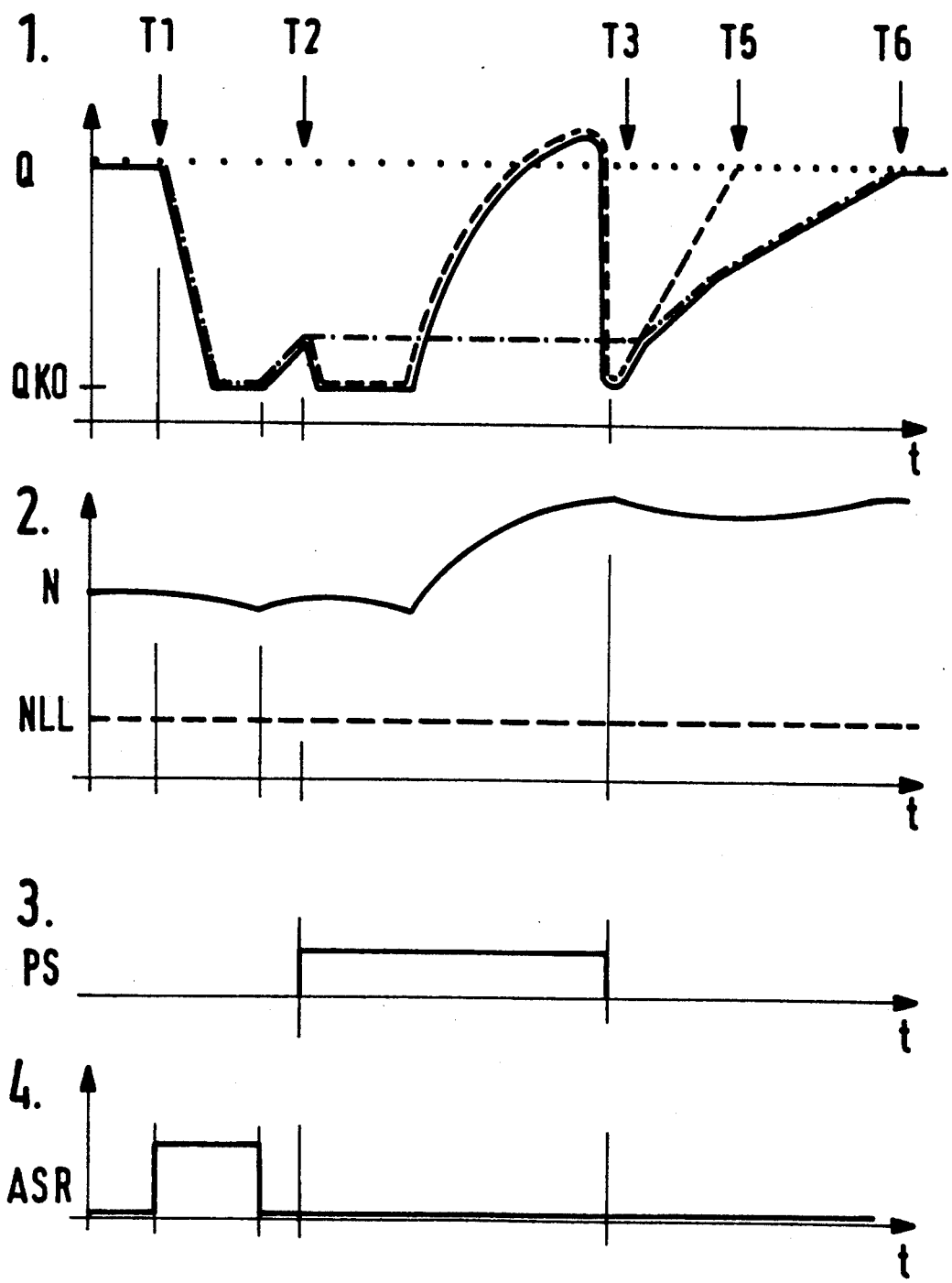
Figure 4C:
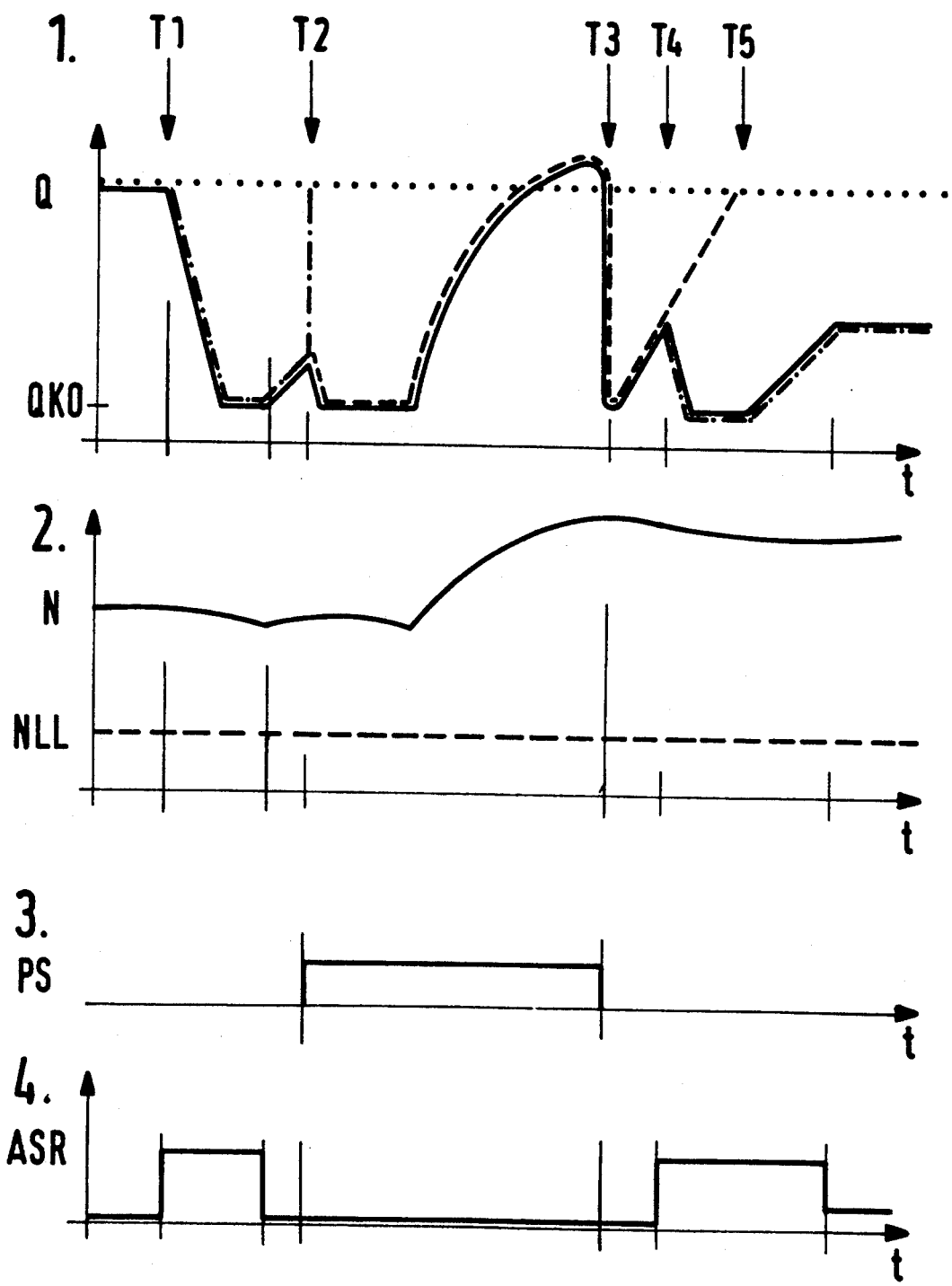

FIGS. 4a, 4b and 4c show various signals plotted as a function of time. In part 1 of these Figures, the control signals from the various control units are plotted. The limited driver request signal QKFB is drawn as a dotted line. The control signal QKA from the slip control 70 is drawn as a dot-dash line. The control signal QKG from the automatic transmission control 60 is drawn as a broken line. The up-to-date signal QK that is supplied to the pump unit is drawn as a solid line.

A rotational speed N is drawn in part 2 of FIGS. 4a, 4b and 4c as a solid line, and an idling speed NLL is drawn as a broken line. The priority signal PS is plotted as a function of time in part 3 of FIGS. 4a, 4b and 4c. A signal indicative of slippage at the wheels is drawn in part 4 of FIGS. 4a, 4b and 4c.

At instant T1, the drive slip control 70 recognizes a spinning of the drive wheels, and, therefore, decreases the quantity of fuel to be injected. Starting from the driver request value QKF, the injected fuel quantity decreases at a linear rate, until a runaway value QKO is reached. If the value QKF is reached and the drive slip control 70 still recognizes that the wheels are spinning, the quantity of fuel to be injected remains constant at the runaway value QKO. At the same time, the rotational speed N decreases slightly. If slippage no longer occurs, the drive slip control 70 slowly increases the quantity of fuel to be injected.

At instant T2, the automatic transmission control 60 emits the priority signal PS. Thereafter, the automatic transmission control 60, together with the idle-speed controller 240, determines the quantity of fuel to be injected. The quantity of fuel to be injected again decreases linearly to the runaway value QKO, until the end of the frictional connection is recognized, which occurs when the uncoupling is complete and there is no power transmission from the engine to the drive wheels. At this instant, the automatic transmission control 60 increases the quantity of fuel to be injected. Following the increase, and immediately before instant T3, there is a sharp decrease in the quantity of fuel to be injected. In the switching operation phase, in which there is an increase in the quantity of fuel to be injected, there is no power transmission to the drive wheels. Driving conditions critical to safety cannot occur if, during this time, a decrease in fuel injection or no fuel injection was necessary because of the spinning of the drive wheels.

At instant T3, the priority signal PS from the automatic transmission control 60 is canceled, and the switching operation is ended. During the time that the priority signal PS is present, the rotational speed N decreases slightly and then increases to a higher value. At instant T4, the drive slip control 70 recognizes a renewed spinning of the drive wheels. A decrease in the quantity of fuel to be injected follows by means of the drive slip control 70. At instant T5, the control signal QKG from the automatic transmission control 60 again corresponds to the driver request signal QKF.

In FIG. 4a, the various signal are shown for the case when the priority signal PS is present and the drive slip control 70 has no effect on the quantity of fuel to be injected. During this time, the drive slip control 70 is active and continuously calculates an up-to-date control signal QKA, which is drawn as a dot-dash line. However, this control signal QKA has no influence on the up-to-date signal QK. After the switching operation has ended, the automatic transmission control 60 increases the control signal QKG to the limited driver request signal QKFB. Between instants T2 and T3, i.e., when the priority signal PS from the automatic transmission control 60 is present, the up-to-date signal QK corresponds to the control signal QKG from the automatic transmission control 60.

At instant T3, starting from when the priority signal PS is canceled, the smaller of the control signals QKA, QKG and QKFB determines the up-to-date signal QK. If at instant T4 the drive slip control 70 once again recognizes that the drive wheels are spinning, it decreases the quantity of fuel to be injected. The drive slip control 70 starts at the up-to-date control signal QKA of the drive slip control 70 or at the up-to-date signal QK.

At instant T4, the drive slip control 70 again determines the up-to-date signal QK.

If there is a priority signal PS from the automatic transmission control 60, the automatic transmission control 60 determines the quantity of fuel to be injected. If there is no priority signal PS from the automatic transmission control 60, the signal QKA from the drive slip control 70, the driver request QKFB, or the signal QKG from the automatic transmission control 60 determines the quantity of fuel QK to be injected, if it is recognized that the drive wheels are spinning.

An advantage of the system according to the present invention is that when the priority signal PS is present, the drive slip control 70 has an effect until the control signal QKA from the drive slip control 70 is greater than the control signal QKG from the automatic transmission control 60. If this condition is satisfied, the drive slip control 70 is switched off, i.e., it is set in its initial state, and does not supply a control signal.

FIG. 4b shows the various signals in the case when the drive slip control 70 is inactive due to the presence of the priority signal PS. At instant T2, starting from when the priority signal PS is available, the control signal QKA from the drive slip control 70 remains constant, until there is no longer a priority signal PS. At the instant it is recognized that the drive wheels are no longer spinning, the control signal QKA from the drive slip control 70 increases at a linear rate until instant T6. When the priority signal PS is canceled, the drive slip control 70 is "thawed", i.e., it continues its control operations with the old values of the control signal QKA.

After the drive slip control 70 thaws, the smaller of the control signals QKA, QKG and QKFB determines the up-to-date signal QK. In this example, it is the control signal QKA from the drive slip control 70.

FIG. 4c shows the various signals in the case when the drive slip control 70 is reset due to the existence of a priority signal PS from the automatic transmission control 60. At instant T1, the drive slip control 70 recognizes that the drive wheels are spinning. The result is that the drive slip control 70 emits a control signal QKA which decreases from the limited driver request value QKFB to the runaway value QKO. At instant T2, the automatic transmission control 60 emits a priority signal PS. This signal causes the drive slip control 70 to be reset, i.e., the drive slip control 70 shifts to the passive state in which it is found when the spinning of the drive wheels has not been recognized for a long period of time. In other words, the drive slip control 70 does not emit a control signal.

The priority signal PS from the automatic transmission control 60 is canceled at instant T3. This means that it is possible for the drive slip control 70 to intervene. At instant T4, the drive slip control 70 again recognizes that the drive wheels are spinning. As a result, it reduces the quantity of fuel to be injected. The drive slip control 70 starts with the up-to-date injected quantity QK and decreases it linearly over time until the zero value is reached. So long as the automatic transmission control 60 supplies a control signal QKG smaller than the driver request signal QKF, the drive slip control 70 starts with the control signal QKG from the automatic transmission control 60.

We claim:

1. A system for the open-loop control of a power-regulating positioning unit in a motor vehicle, comprising:

a drive slip control unit coupled to the positioning unit, the drive slip control unit providing a first control signal for influencing the position of the positioning unit;

means for providing a second control signal for influencing the position of the positioning unit, the means for providing coupled to the positioning unit, the second control signal dependent upon a driver request; and an automatic transmission control unit coupled to the positioning unit, the automatic transmission control unit providing a third control signal for influencing the position of the positioning unit, the third control signal having a greater influence on the positioning unit than the first and second control signals during a first predetermined period of time.

2. The system as recited in claim 1, wherein the automatic transmission control unit further provides a priority signal during the first predetermined period of time.

3. The system as recited in claim 2, wherein only the third control signal determines the position of the positioning unit during the first predetermined period of time.

4. The system as recited in claim 2, wherein the first control signal does not determine the position of the positioning unit during the first predetermined period of time.

5. The system as recited in claim 2, wherein the first control signal influences the position of the positioning unit until the first control signal exceeds the third control signal, at which time, the drive slip control unit is switched off.

6. The system as recited in claim 2, wherein the first control signal has a constant value.

7. The system as recited in claim 2, wherein the drive slip control unit is reset when the automatic transmission control unit provides the priority signal.

8. The system as recited in claim 2, wherein the automatic transmission control unit ceases to provide the priority signal during a second predetermined period of time.

9. The system as recited in claim 8, wherein the automatic transmission control unit ceases to provide the priority signal if a gear has been engaged.

10. The system as recited in claim 8, wherein the automatic transmission control unit ceases to provide the priority signal if a power transmission takes place.

11. The system as recited in claim 8, wherein the automatic transmission control unit ceases to provide the priority signal if the second control signal is equal to the third control signal.

12. The system as recited in claim 8, wherein the minimum of the first, second and third control signals determines the position of the positioning unit during the second predetermined period of time.

13. The system as recited in claim 8, wherein the drive slip control unit provides a fourth control signal indicative of the current position of the positioning unit when the automatic transmission control unit ceases to provide the priority signal.

14. The system as recited in claim 8, wherein the drive slip control unit is reactivated when the automatic transmission control unit ceases to provide the priority signal.

15. The system as recited in claim 8, wherein the drive slip control unit is reactivated if the first control signal is smaller than the third control signal.

16. The system as recited in claim 1, wherein the positioning unit is used to determine the quantity of fuel to be injected into an internal-combustion engine.

17. The system as recited in claim 1, wherein the positioning unit is used to determine the position of a throttle valve.

* * * * *